(12) United States Patent
Bourlas et al.

(10) Patent No.: US 7,310,353 B1
(45) Date of Patent: Dec. 18, 2007

(54) COMPRESSION OF OVERHEAD IN LAYERED DATA COMMUNICATION LINKS

(76) Inventors: Yair Bourlas, 17876 Aguamiel Rd., San Diego, CA (US) 92127; Jacques Behar, 5823 Erlanger, San Diego, CA (US) 92122; Kenneth L. Stanwood, 2403 Montgomery Ave., Cardiff by the Sea, CA (US) 92007

( * ) Notice: Subject to any disclaimer, the term of this patent is extended or adjusted under 35 U.S.C. 154(b) by 722 days.

(21) Appl. No.: 09/702,293

(22) Filed: Oct. 30, 2000

(51) Int. Cl.
*H04J 3/24* (2006.01)
*H04L 12/28* (2006.01)

(52) U.S. Cl. ............... 370/473; 370/395.2; 370/395.53

(58) Field of Classification Search ................ 370/252, 370/465, 351, 389, 395.1, 395.6, 466, 469–474, 370/349, 392; 711/202, 203
See application file for complete search history.

(56) References Cited

U.S. PATENT DOCUMENTS

| | | | |
|---|---|---|---|
| 3,949,404 A | | 4/1976 | Fletcher et al. |
| 4,495,619 A | | 1/1985 | Acampora |
| 5,130,983 A | | 7/1992 | Heffner |
| 5,297,144 A | | 3/1994 | Gilbert et al. |
| 5,420,851 A | | 5/1995 | Seshadri et al. |
| 5,444,698 A | | 8/1995 | Kito |
| 5,511,082 A | | 4/1996 | How et al. |
| 5,615,210 A | * | 3/1997 | Kaiyama et al. ............ 370/389 |
| 5,615,212 A | | 3/1997 | Ruszczyk et al. |
| 5,638,371 A | | 6/1997 | Raychaudhuri et al. |
| 5,638,374 A | | 6/1997 | Heath |
| 5,675,573 A | | 10/1997 | Karol et al. |
| 5,717,689 A | * | 2/1998 | Ayanoglu ................ 370/349 |
| 5,751,708 A | | 5/1998 | Eng et al. |
| 5,768,254 A | | 6/1998 | Papadopoulos et al. |
| 5,793,427 A | * | 8/1998 | Mills et al. ............ 348/391.1 |
| 5,828,695 A | | 10/1998 | Webb |
| 5,859,619 A | | 1/1999 | Wu et al. |
| 5,890,055 A | | 3/1999 | Chu et al. |
| 5,905,727 A | * | 5/1999 | Christensen et al. ..... 370/395.3 |
| 5,910,954 A | * | 6/1999 | Bronstein et al. .......... 370/401 |
| 5,946,313 A | * | 8/1999 | Allan et al. ................ 370/397 |

(Continued)

OTHER PUBLICATIONS

Lin., et al., "*Error Control Coding, Fundamentals and Applications*", Prentice-Hall Computer Applications in Electrical Engineering Series., 1993, pp. 315-349.

(Continued)

*Primary Examiner*—Alpus H. Hsu
*Assistant Examiner*—Clemence Han
(74) *Attorney, Agent, or Firm*—Schwabe, Williamson & Wyatt, P.C.

(57) ABSTRACT

An apparatus, system and method for converting data in a first packet format, having overhead data in the form of headers and/or trailer padding, into a second, variable-length packet format, in which some of the header and/or trailer overhead is removed during conversion in order to more efficiently utilize the limited bit rate capacity of a link which will convey the data in the second format. Embodiments include a communication subnetwork for interconnecting a plurality of users to a wide area network through a wireless link, an Asynchronous Transfer Mode (ATM) switch for converting ATM cells into a variable-length packet format, and a convergence system for converting ATM cells into data packets in Media Access Control (MAC) format.

52 Claims, 11 Drawing Sheets

U.S. PATENT DOCUMENTS

| | | | |
|---|---|---|---|
| 5,978,361 A * | 11/1999 | Kokudo | 370/310.2 |
| 6,006,069 A | 12/1999 | Langston | |
| 6,016,311 A | 1/2000 | Gilbert et al. | |
| 6,016,313 A | 1/2000 | Foster, Jr. et al. | |
| 6,038,455 A | 3/2000 | Gardner et al. | |
| 6,094,421 A | 7/2000 | Scott | |
| 6,112,080 A | 8/2000 | Anderson et al. | |
| 6,151,318 A * | 11/2000 | Woodward et al. | 370/392 |
| 6,256,323 B1 * | 7/2001 | Benayoun et al. | 370/474 |
| 6,339,585 B1 | 1/2002 | Hulyalkar | |
| 6,370,112 B1 | 4/2002 | Voelker | |
| 6,389,038 B1 * | 5/2002 | Goldberg et al. | 370/471 |
| 6,400,682 B1 * | 6/2002 | Regula | 370/223 |
| 6,512,773 B1 * | 1/2003 | Scott | 370/395.61 |
| 6,590,897 B1 * | 7/2003 | Lauffenburger et al. | 370/395.6 |
| 6,618,397 B1 * | 9/2003 | Huang | 370/474 |
| 6,683,866 B1 | 1/2004 | Stanwood | |
| 6,771,660 B1 | 8/2004 | Bourlas | |
| 2004/0179486 A1 * | 9/2004 | Agarwal et al. | 370/316 |

OTHER PUBLICATIONS

L.H. Charles Lee, "Convolutional Coding, Fundamentals and Applications", Artech House, Inc., 1997, p. 11-51.

Redl, et al., "An Introduction to GSM", Artech House Inc., 1995; pp. 84, 85 and 95.

C.E. Shannon, "A Mathematical Theory of Communication", Bell System Technical Journal, pp. 379-423 (Part 1), 623-656 (Part II), Jul. 1948.

Ulm., et al., "Data-Over-Cable Interface Specifications, Radio Frequency Interface Specification", Hewlett Packard Interim Specification, Doc. Control No. SP-RFII01-970321, published Mar. 21, 1997 by MCNS Holdings, L.P., Section 6, pp. 43-85.

Wolf, et al., "On the Weight Distribution of Linear Block Codes Formed From Convolutional Codes", IEEE, IEEE Transactions on Communications, vol. 44:9, Sep. 1996.

"Asynchronous Transfer Mode (ATM) Technical Overview", $2^{nd}$ Edition, Prentice Hall, Oct. 1995, Chapter 3, pp. 21-25.

Stanwood, et al.; Method and apparatus for data transportation and synchronization between MAC and physical layers; file history for U.S. Patent No. 6,683,866, issued Jan. 27, 2004.

"Air Interface for Fixed Broadband Wireless Access Systems," IEEE 802.16.1-00/01r4, Sep. 2000, 340 pgs, New York, NY.

* cited by examiner

Layered Data Transport Architecture

FIG. 9
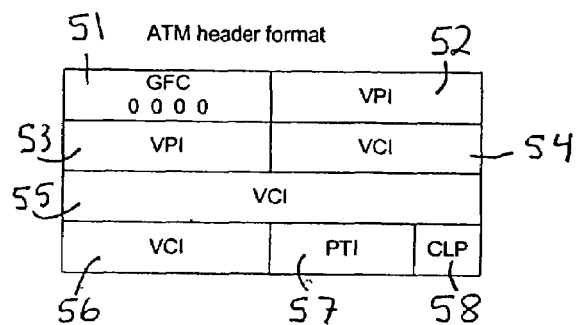
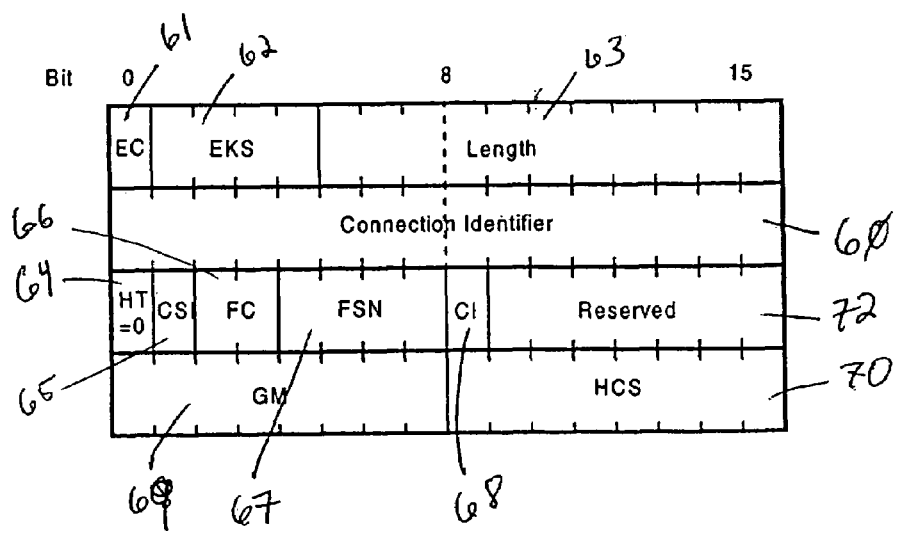
FIG. 10

MAC header format

| EH 1 | PC/PM | CIDa | |
|---|---|---|---|
| CIDa | | CIDb | |
| CIDb | | | |
| CIDb | | CPT | PDE |
| Length | | | |

ATM header format

| GFC 0 0 0 0 | VPI | |
|---|---|---|
| VPI | VCI | |
| VCI | | |
| VCI | PTI | CLP |

Mapping:

| MAC header | ATM header |
|---|---|
| EH/PC/PM | GFC (set to zero at the northbound interface between the ATM and MAC) |
| CIDa | VPI |
| CIDb | VCI |
| CPT | PTI |
| PDE | CLP |
| Length | N/A no need to map. |

COMPRESSION OF OVERHEAD IN LAYERED DATA COMMUNICATION LINKS

CROSS REFERENCE TO RELATED APPLICATIONS

This invention is related to commonly assigned co-pending U.S. patent application Ser. No. 09/430,379 (U.S. Ser. No. 09/430,379), filed Oct. 29, 1999, entitled "Method and Apparatus for Data Transportation and Synchronization between MAC and Physical Layers in a Wireless Communication System," which is hereby incorporated in its entirety by reference.

FIELD OF THE INVENTION

This invention relates to packet data communication systems, and to reformatting data in such systems before transferring the data through a link.

BACKGROUND

Data communication systems typically transfer data from a source to an end user by routing the data in packets through a series of nodes connected by links. All links have physical limits on their data-carrying capacity or available bandwidth, and therefore may benefit from compression of the data they convey in order to increase their effective data throughput.

A number of standardized data packet formats and protocols have been developed to facilitate various aspects of data communication. For example, Internet Protocol or IP format permits flexibility in the routing of data between a source and a destination, while other formats convey voice data with limits on the time delays, so as to ensure that the voice data can be reconstructed with adequate fidelity at the receiving end. It is often desirable for data in various formats to utilize the same data links as part of their transmission paths. This is particularly true for links directed to solving the "last mile" problem, that is, connecting end users to the various communications nets. Since such "last mile" solutions should preferably address all of the end user's needs, a wide range of protocols will need to be accommodated.

SUMMARY OF THE INVENTION

The present invention can be embodied in a broadband wireless link which connects a plurality of end users to various networks. The invention can be practiced consistently with the general framework of the Media Access Control (MAC) protocol, as defined for example in "Media Access Control Protocol Based on DOCSIS 1.1," submitted Dec. 22, 1999 in connection with IEEE 802.16 Broadband Wireless Access Working Group and incorporated herein by reference, and is expected to be useable within the framework of the IEEE 802.16.1 MAC when that standard is defined. Some embodiments diverge from aspects of MAC protocols as presently known or proposed. In addition to embodiments within a MAC protocol framework, however, those skilled in the art will understand that the present invention may be practiced in systems which are not restricted to implementation using a MAC protocol.

Embodiments of the present invention include a millimeter wave wireless RF channel communications system which connects single base stations each to a plurality of relatively proximate Customer Premise Equipment (CPE) stations. A network of such base stations with their surrounding CPEs can provide all communications services over a large area, such as a city. This system is representative of a variety of present and future links having a limited communication media which must be shared by a plurality of different entities. For such systems, the presently existing packet data communication formats do not provide optimum utilization of the available communication media. What is needed for such links, therefore, is a method of compressing data prior to transferring it through the link. At the end of the link the data may be returned to a previous format, maintained, or translated to a new format.

In some embodiments, the invention reformats and compresses data which has been formatted according to the Asynchronous Transfer Mode (ATM) data transfer protocol. ATM is described in "High Performance Communication Networks" by Jean Walrand and Pravin Varaiya, second edition © 2000 by Morgan Kaufmann Publishers, ISBN 1-55860-574-6, particularly in Chapter 6. ATM can satisfy a wide range of data communications needs, including highly variable data rates like Internet traffic, as well as time-sensitive traffic for voice or video connections. ATM provides flexibility by providing relatively small, fixed-length cells as the packets in which data is communicated. However, this flexible format imposes substantial data transfer overhead. For example, to facilitate transmission each cell requires a header, sometimes called a "cell tax," and many source messages converted to ATM format require overhead in the form of fill bytes in a last cell of the message in order to coordinate the end of the message with an ATM cell boundary. Both of these factors burden transfers and therefore may impair the efficiency of a communicating link. As such, limited-bandwidth links will particularly benefit from a method which enhances their carrying capacity by reducing these overhead burdens.

Embodiments of the present invention address the above needs by providing a system, methods, and apparatus which compress incoming data in preparation for transferring the data over a link. Incoming data which has been formatted according to a first protocol, for example fixed-length packet Asynchronous Transfer Mode (ATM) standard format, is compressed and reformatted and then conveyed over one or more links in accordance with a second protocol, for example variable-length packet Media Access Control (MAC) protocol. After it has traversed the link the data may be reconstructed back into the first protocol format so that the data modifications performed by the link will be transparent to the receiving node or user.

Packet data formats include user data which is intended for communication from a source to an end user and overhead data which is not for delivery to the end user, but rather facilitates the transfer of the data. ATM is an excellent example of a packet data format which imposes a significant overhead data burden.

There are two significant sources of overhead in fixed-length packet formats such as ATM. First, each packet has a header which guides and facilitates transmission of the data, and thus is entirely overhead data; this typically constitutes 5 bytes out of a total cell length of 53 bytes. Second, in the circumstance that a source packet format has been converted to a fixed-length packet format such as ATM, there will generally be "padding" bytes to "top off" at least some of the resulting fixed-length packets, and such padding may appear in the last ATM cell in a sequence of cells which convey the information from a larger incoming data packet or message. Embodiments of the present invention provide a system, methods and apparatus which reduce the effects of the ATM "cell tax" by at least temporarily reformatting ATM cells into a different packet format, for example Media Access Control (MAC) packets.

The most detailed description of an embodiment of the present invention involves exemplary incoming data in the form of ATM cells, and converts the data with compression into MAC packets, which constitute a second exemplary data packet format. However, it should be kept in mind that this invention may be embodied in any present or future communication systems which accepts data in packets having overhead in the form of either repetitive headers or packet alignment filler, and which at least temporarily reformats such data packets, with compression as described, into a variable-length packet format for transmission through a link.

Some aspects of the present invention include a method for converting data from first packets having a first format (for example, ATM cells) into a second packet having a second format (for example, variable-length MAC packets). Both first and second packets have headers, which include overhead data, and data "payloads" which include (but may not be limited to) user data. Features are included which reduce the overhead from first-format packet headers and padding sources which will be carried in the second-format packets.

In one such aspect, the padding in a first-format data packet is removed, and an indication of the amount of padding removed is included in the second-format packet into which the first-format packet is being converted. Since the first-packet size is known, the indication of the non-padding data quantity is equivalent to an indication of the amount of padding removed. After the data is transferred in second-format packets, it may be reconstructed into the first format.

In a second such aspect, headers of first-format packets are compressed upon conversion into second-format packets, rather than being simply copied into the payload of the second-format packets. The compression is accomplished by employing a selected one of a plurality of methods, each of which map at least part of the first-format header to a part of the second-format header. The particular compression method is selected when a communication channel is set up, and depends upon certain switching characteristics of the channel.

In a third such aspect, information common to the headers of a plurality of first-format packets is mapped into locations in a header of a single second-format packet header, and then the remaining common header information from the plurality of first-format packets is discarded while a representation of payload data from each of the first-format packets is entered into the payload of the second-format packet. If all of the first-format header information cannot be assumed to be common, then the part which may not be common may be included with the representation of payload data from each first-format packet which is entered into the payload of the second-format packet.

Further embodiments include a convergence system which reformats data packets as described herein, a wireless link of a communication system which reformats incoming data as described herein prior to conveying the data over the link, and an apparatus for converting data which employs a combination of electronic hardware and programmable computing circuits to compress and reformat data as described herein.

Another embodiment is a system for accepting data in ATM format, translating the data into a MAC format with some combination of header and trailer data compression, and transmitting the data across a wireless millimeter-wave wireless link between a Base Station and a plurality of users in a plurality of sectors, each user having Customer Premise Equipment to receive the data.

BRIEF DESCRIPTION OF THE DRAWINGS

FIG. 9 details a representative ATM header format.

FIG. 10 details a representative MAC header format.

DETAILED DESCRIPTION

1. Packet Data Networks

Data packets traveling through a network may be considered as passing through various "layers" of processing. As an example, data packets initially in an Internet Protocol (IP) format may be converted into ATM cells at some point as they travel to a destination. The processing layers of such a conversion include a "service access" layer for receiving the incoming data, a "convergence layer" or system for translating the data from one format to another, and a "transmission layer" for transmitting the reformatted data to its next destination. Such "convergence layers," or convergence systems, come in many varieties and appear at many points in a network.

Figure 1:
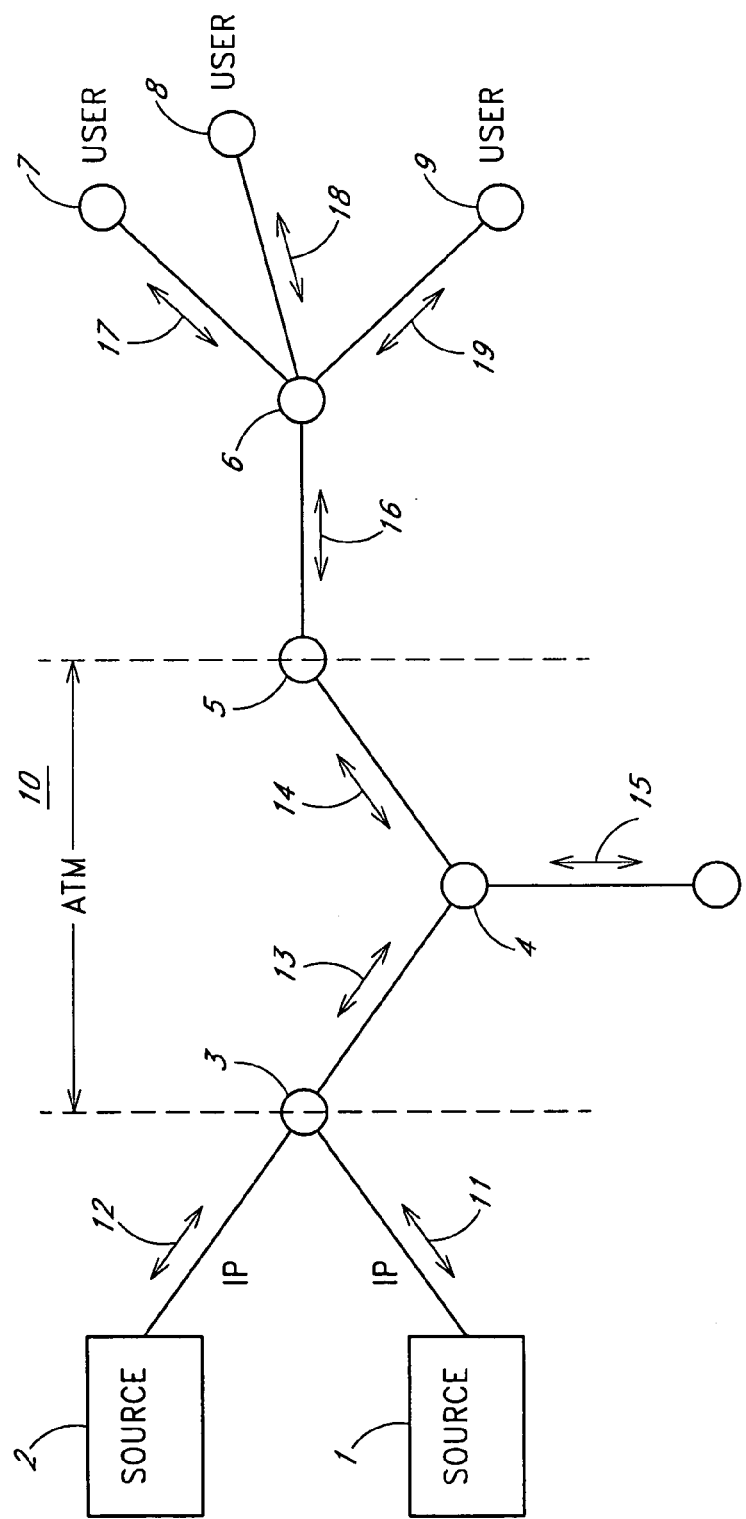
FIG. 1 represents a general network involving data format translations.

FIG. 1 depicts a representative network in which such convergence systems are found. Internet Protocol (IP) packets 11 from a first source 1, and IP packets 12 from a second source 2, are converted at Switch 3 into ATM cells 13 for transmission over ATM subnet 10 which extends from Switch 3 to Switch 5.

Switch 3 includes a convergence layer or system which adapts ATM cells from a different format, and which is accordingly called an ATM Adaptation Layer (AAL). There are a variety of such AALs, including AAL1, AAL2, AAL3/4, and AAL5. IP format packets, in particular, are converted to ATM by AAL5 (ATM Adaptation Layer 5). The apparatus at Switch 3 converts incoming data from ATM data in accordance with the appropriate AAL, and in particular converts data arriving in IP format in accordance with AAL5. (ATM cells may be converted from data in other formats: from constant bit rate sources such as voice and constant-rate audio or video using AAL1; from variable-length data packet streams conveying, for example, compressed voice through AAL2; and through AAL3/4 for SMDS and MAN protocol data which is being routed over an ATM subnet.) The AAL5 conversion from IP packets to ATM cells is a good example of a process which converts original packets of a first size into fixed-length packets of a generally different length from the original packets, and in doing so generates overhead in the form of both ATM headers and padding data. Therefore, embodiments compressing data from packets produced in accordance with AAL5 are extensively described herein.

In a typical ATM subnetwork, as briefly represented at section 10 in FIG. 1, ATM cells 13 and 14 will travel both directions along each link between nodes Switches 3, 4 and 5, and also to other unnamed nodes as represented by ATM cells 15. ATM cells 14 arriving at the node Switch 5 will be reformatted into a different packet format to form data packets 16. A switching apparatus to implement Switch 5, and a convergence method and a system implementing the method in such switch, are detailed below. The data packets 16 leaving Switch 5 are communicated to and from Node 6, which is a central point for communications to and from a plurality of users. For example, packets 17 are transferred to or from a first user 7, packets 18 to or from a second user 8, and packets 19 to or from nth user 9.

2. Communication Subnetwork System

A specific embodiment of a communication subnetwork which includes an apparatus and system performing the functions of the Switch 5 is described in detail in related U.S. Ser. No. 09/430,379, incorporated hereinabove by reference. U.S. Ser. No. 09/430,379 describes a communication subnetwork or system having base stations which each provide wireless links for transferring data between a plurality of end users (e.g. 7, 8 and 9) and a network (e.g. 10) through a broadband wireless link. This link uses a limited media, namely the wireless communication spectrum, which must be shared by the plurality of users. In order to use the limited spectrum (or bandwidth) efficiently, the link conveys data in a particular packet format in accordance with a Media Access Control protocol. Accordingly, the packet format utilized is called Media Access Control (MAC) format, and the packets are called MAC packets.

Figure 2:
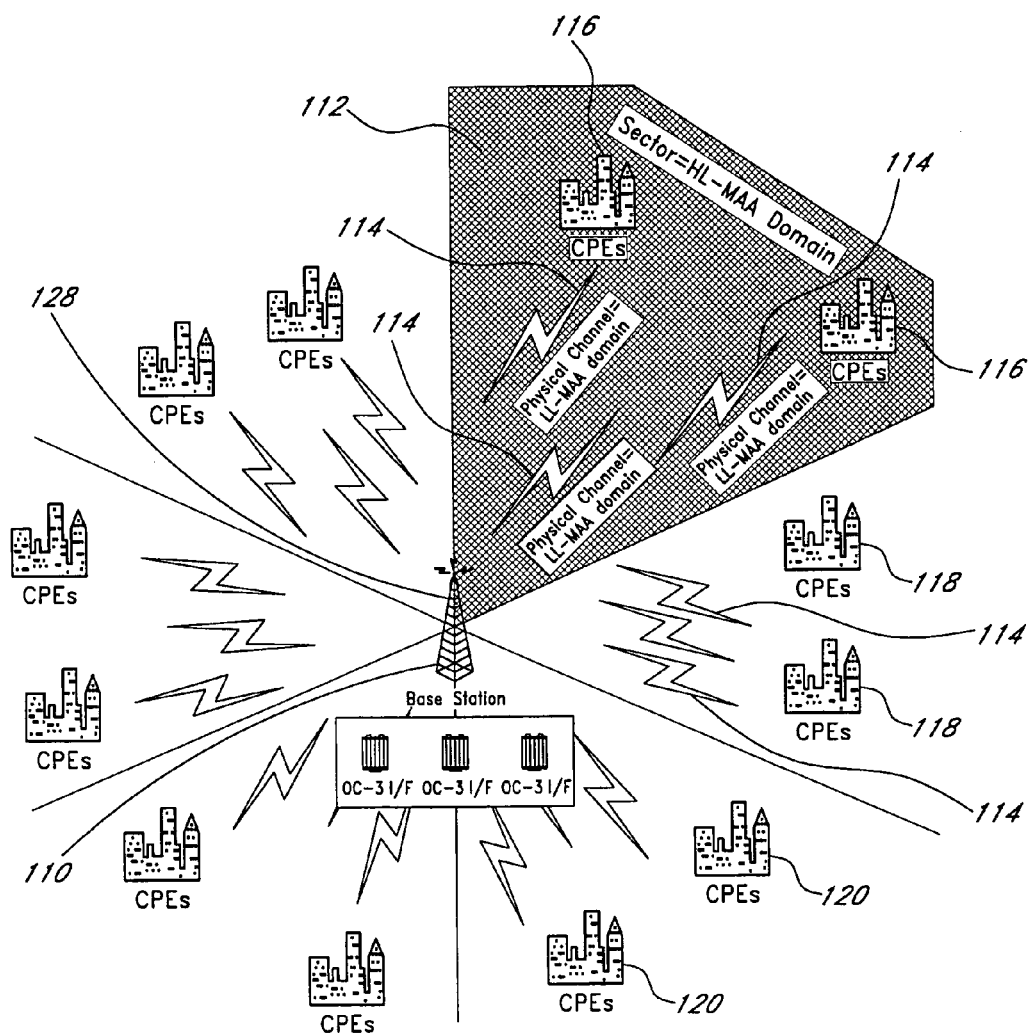
FIG. 2 represents sectorized communication between a Base Station and CPEs.

FIG. 2 shows details of the links to a plurality of users described in the referenced wireless communication system. The Base Station 110 includes apparatus and control to perform the functions of Switch 5 of FIG. 1. The Base Station 110, via its antenna structure 128, transmits to (and receives from) a plurality of users each having a corresponding Customer Premise Equipment (CPE) station 116, 118 or 120. The transmissions to and from the antenna structure 128 are directional in nature, so that channels are limited to particular transmission sectors, for example sector 112. Transmissions within sector 112 are limited to CPEs 116 which are located within the transmission scope of that sector.

Within sectors, the downlink transmissions are typically multiplexed, and each CPE within a particular sector receives the same transmission from the antenna structure 128 of the Base Station 110. Nonetheless, each CPE (e.g. 116) has a distinct "virtual" connection, or channel, 114 within its sector (e.g. 112). A channel 114 conveys that part of downlink transmissions within the sector 112 from the Base Station 110 which contain data for the particular CPE 116, and also conveys uplink transmissions from the particular CPE 116 to the Base Station 110. CPEs in other sectors, for example the CPEs 118 or 120, likewise communicate to Base Station 110 through channels 114 which are virtual channels within the transmissions of their particular sector. The transmissions between different sectors are independent of each other. "Sectorized" transmission permits spectrum reuse within a narrow area, thus providing more bandwidth to service particular users.

Figure 3:
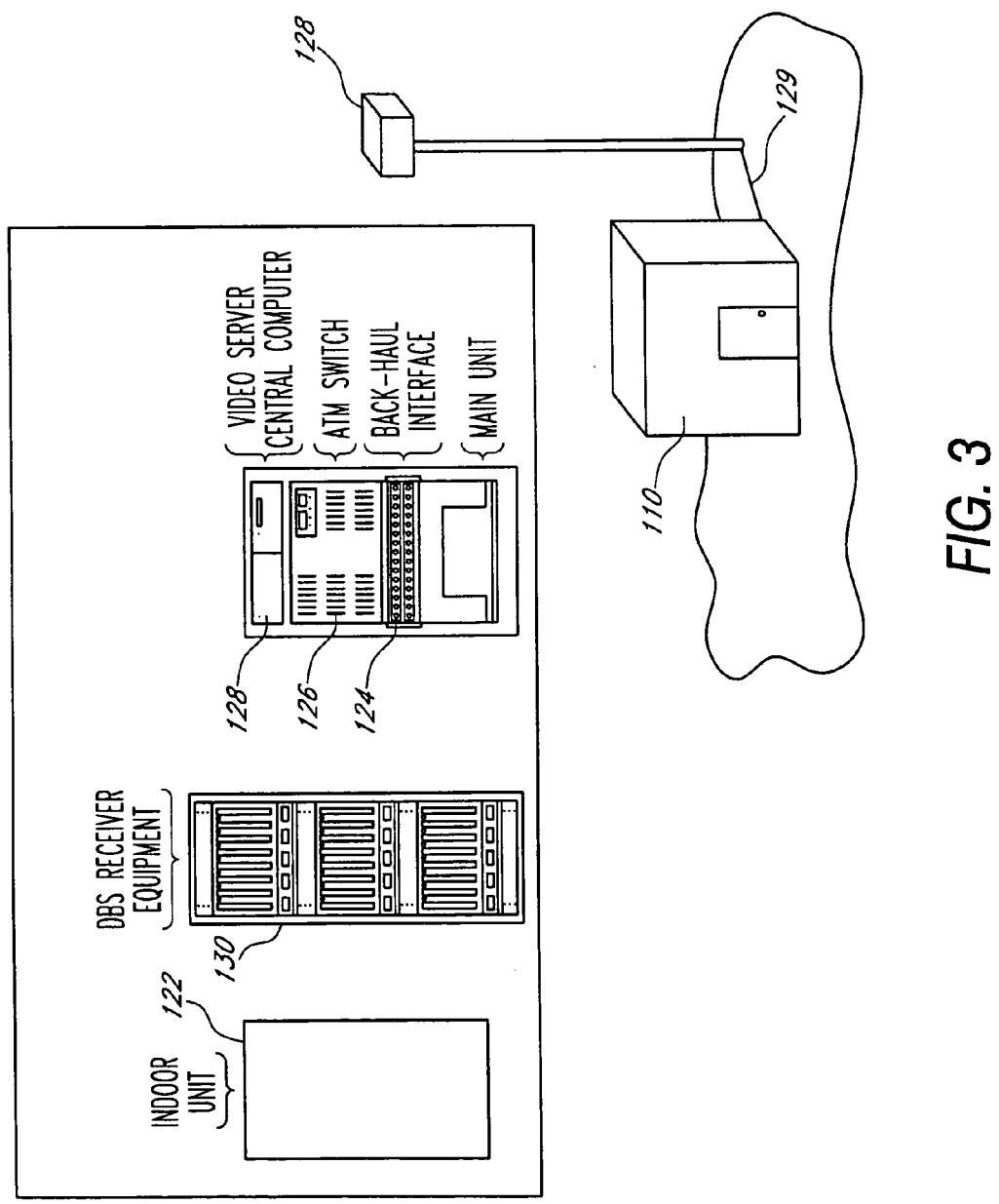
FIG. 3 shows apparatus implementing Base Station processes.

FIG. 3 shows details of the Base Station 110, and the antenna structure 128 to which it is connected by intermediate frequency interconnections 129. The antenna structure 128 preferably receives signals from the Base Station 110 at an intermediate frequency, and modulates the signals to a higher frequency before actually transmitting them along a plurality of distinct directions. The intermediate frequency signals are provided by the Indoor Unit 122. Signals received from the antenna structure 128 are delivered to the receiver equipment 130. The video server and central computer 128 typically controls and translates the actual signals transmitted by Indoor Unit 122 or received by receiver 130. The central computer 128 communicates data to and from the network through ATM switch 126, which in turn is connected to the network through Back-Haul Interface 124. The Interface 124 preferably accepts data from a dedicated "back haul" which generally comprises either a fiber-optic cable, a microwave link or another dedicated high throughput connection to a data router (not shown) which in turn interfaces to the Internet and/or to other wide area networks such as the public telephone network.

The preferred communication subnetwork system preferably employs an Adaptive Time Division Duplex (ATDD) technique for communication across the wireless link. ATDD is preferably implemented in a framed system in which communication bursts take place periodically, and the burst period defines the time boundaries of a frame. This system imposes certain limitations on header compression of ATM cells reformatted into MAC packets, which is described in detail below, which are described next. It is preferred that such header compression be performed upon all the data which is identified as belonging to the same message (or, in the case of virtual path switching, the same path). The compressed message data preferably is carried in a single MAC packet. In the wireless communication subnetwork described herein, MAC packets are preferably conveyed within a frame, and the frame in turn preferably has a 1 millisecond period. The number of bits which can be communicated within the frame depends upon a number of factors, including the symbol rate (preferably 20 Mbaud), the modulation technique used (which must be more robust for bad signal conditions, and is accordingly slower), and whether part of the frame must be allotted to returning (uplink) communications or to other, high priority messages. Therefore, MAC packets have an upper bound for length which is independent of the size of the incoming message. Accordingly, the described system may not convey a complete incoming message in a single MAC packet, but may break the message into pieces carried in separate MAC packets.

3. Data Packet Convergence System

A data packet convergence system converts incoming data in a first data packet format, for example data formatted as ATM cells, into outgoing data in a second data format, for example a second packet format such as MAC packets. The compression which can be performed upon the incoming data may depend in part upon previous conversions which the data has undergone, if such previous conversions have imposed an overhead burden on the data stream.

Such a data packet convergence system will include modules for performing groupings of functions which the system must accomplish. Each such module, in general, may be implemented in independent hardware, or in programmatically controlled hardware. Even within the latter, the border between program control and hardware control is subject to variation. One implementation of a convergence system may perform bit-level manipulations of data in a general-purpose computer or microcomputer under program control, which another may perform only the highest-level decision making in a general-purpose computing circuit, and may perform many or most decisions and bit manipulations in hardware. For example, an ASIC may be designed to perform most of the functions of some or all of the modules of a convergence system, with only some limited supervisory control provided from a program-controlled general computing apparatus. The tradeoffs between such varied implementations are well understood by those skilled in the art.

4. ATM-to-MAC Convergence

The ATM switch 126 includes apparatus which is configured to perform convergence functions of Switch 5 of FIG. 1, and in particular to perform ATM-to-MAC convergence functions. ATM cells from the network (via interface 124) are compressed and reformatted into a different format, in particular into Media Access Control (MAC) packet format. The switch 126 implements functional modules using hardware under programmatic control. The programmatic control may be provided by an separate computer, such as the central computer 128, or may be provided by microprocessor devices within the ATM switch 126. The data is put into temporary memory, which is hardware such as a memory buffer, and switching hardware is included to reorder the data. However, those skilled in the art will appreciate that decisions and control of that low-level storage and switching hardware may be performed by any combination of hardware and software. At one extreme, a microprocessor system or other computer within the ATM switch 126 or separate from it can be interfaced to control the low-level storage and switching hardware of the switch 126. At the other extreme, an ASIC (application specific integrated circuit) can be used to implement all of the functions for the ATM switch 128. In practice, engineering tradeoffs determine the placing of control functions in either hardware or in a program-controlled computer.

4.a. ATM Adaptation Layers

Operation of an ATM-to-MAC convergence system, such as is included in Switch 5 of FIG. 1 and in the ATM switch 126, will depend in part upon how the incoming ATM cells were formatted into ATM cells. Formatting into ATM cells will either have been performed at the data source, or at an earlier switch such as the Switch 3 of FIG. 1. Formatting data into ATM cells imposes overhead, some of which will be removed before transmitting a representation of the data in differently formatted packets (e.g. at 16, 17, 18 and 19 of FIG. 1). Accordingly, details of these previous conversions are presented below.

Figure 6:
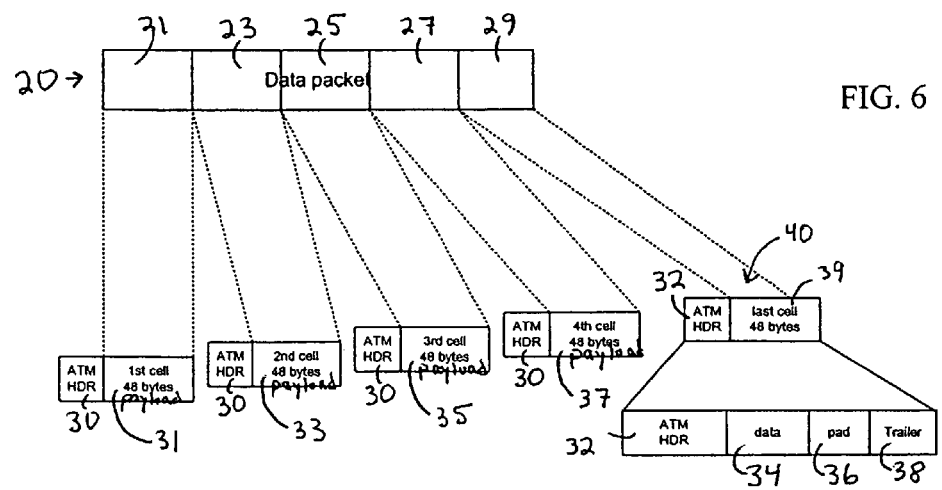
FIG. 6 shows a packet payload related to a block of ATM cells including a trailer cell.

FIG. 6 represents part of a conversion from a representative source data packet into ATM cells in accordance with the AAL5 process, which is defined in an ITU-T 363.5 recommendation "B-ISDN ATM Adaptation Layer specification: Type 5 AAL". ATM cells have a relatively small 48 byte payloads 31, 33, 35 and 37, so that the representation, in FIG. 6, of a single incoming packet filling a plurality of ATM cells is the typical case. Each ATM cell has a header. For the data shown, all but trailer cell 40 have the same header 30. Most ATM cells have a 48 byte payload, which is true of payloads 31, 33, 35 and 37. ATM trailer cell 40 is the last ATM cell used to convey the incoming packet. It is so indicated by a payload type indicator (PTI) in header 32 which is "1" instead of "0," as it would be for first and intermediate ATM cells. The last eight bytes of trailer cell 40 contain trailer data, which is overhead.

Since eight bytes of the payload of trailer cell 40 are dedicated to overhead trailer data, only forty bytes are available for effective user data transfer. However, the last part of the incoming packet 20 may not fill these forty available bytes, in which case the remainder of the trailer cell is filled with padding 36. Accordingly, the combination of the trailer cell data 34 and the trailer cell padding 36 totals forty bytes. The trailer cell padding data "tops off" the ATM trailer cell to conform it to the proper ATM cell length.

ATM cells (e.g. 14 in FIG. 1) of a particular ATM connection typically arrive from a network interspersed with ATM cells belonging to other ATM connections. The cells may be stored in a buffer until the last ATM cell formed from a particular source packet (e.g. an IP packet) arrives from the network. In accordance with AAL5, the last ATM cell formed from a particular IP packet is distinguished from all other cells derived from that packet by the value of the payload type indicator (PTI) in the ATM header. In the last cell, PTI=1; in first and intermediate cells, PTI=0.

4.b. ATM-to-MAC Convergence System

Figure 4:
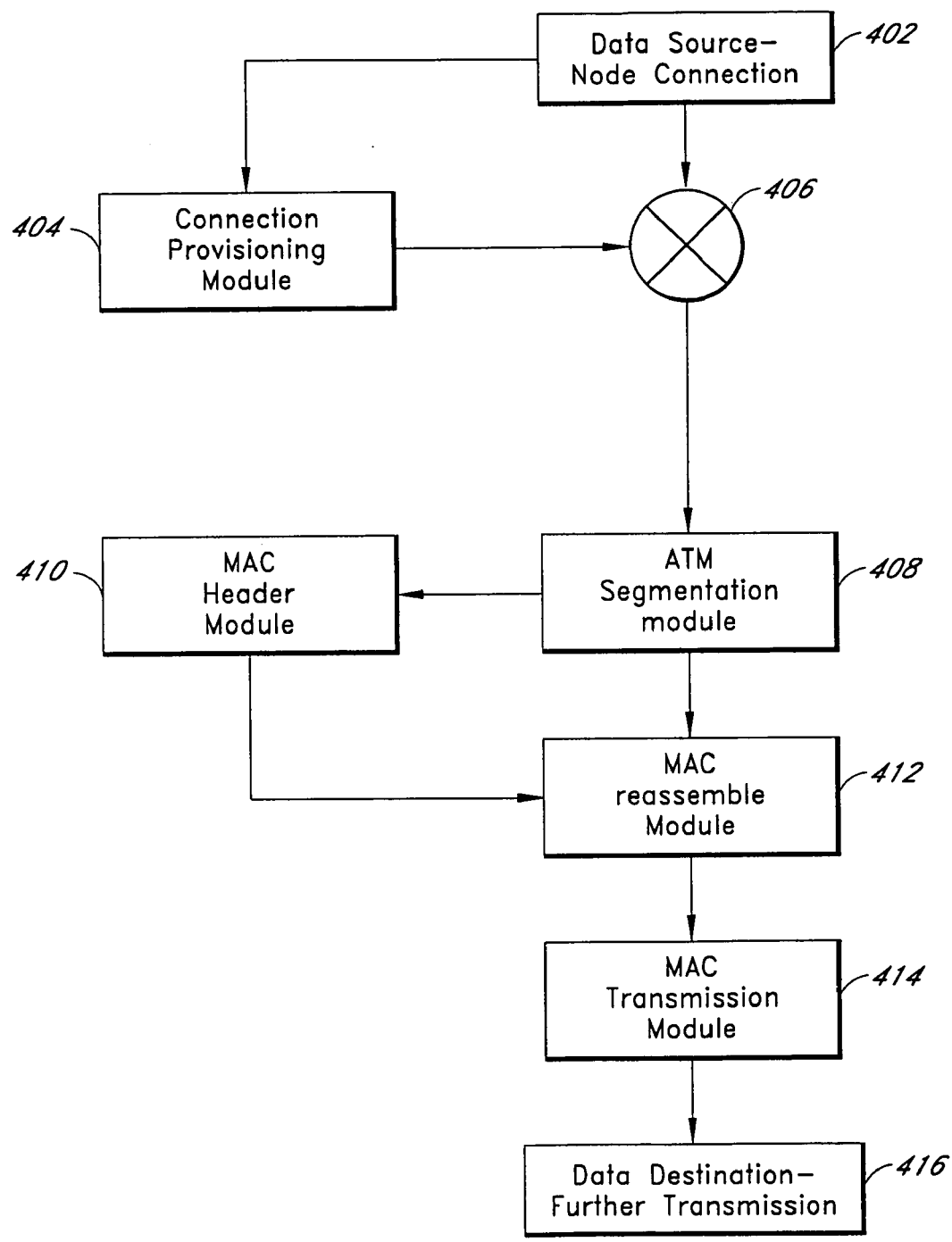
FIG. 4 shows modules in an ATM-to-MAC convergence system according to an embodiment.

FIG. 4 depicts modules included in the ATM-to-MAC Convergence System. The connection provisioning module (CPModule) 404 receives requests for connections from a data source such as a node connection 402, and attends to establishing all of the parameters for the connection. Depending upon the ability of the channel to add another connection, the CPModule controls acceptance of the connection, represented by switch symbol 406 which prevents or allows data from a connection to advance to other modules. When data from a connection is allowed by the CPModule, the ATM segmentation module (ASModule) 408 accepts data arriving as ATM cells into a buffer, sorts them according to their destination (and sometimes a Quality of Service, QoS parameter), and separates their header and payload portions for access by the MAC reassembly module (MRModule) 412. The MAC header module (MHModule) 410 constructs a header for each MAC packet, and the MRModule 412 constructs an outgoing MAC packet from the header created by the MHModule 410 and from data made available by the ASModule 408. Finally, the MAC transmission module (MTModule) 414 transfers the constructed MAC packet to a destination for further transmission (such as to the High Level Media Access Arbitration 502 of FIG. 5, by way of the DAMA Service Access Point, as is described further below).

Those skilled in the art will appreciate that the functions of the different modules may be arranged in an unlimited number of ways. For example, functions from different modules may be performed in the same physical device; indeed, all of the modules can be designed to be performed by a single ASIC. As another example, functions from any particular module need not be performed in a related physical location with other functions of such module, but may be scattered into other modules; and the functions of modules may be incorporated into a different number of functional blocks, so that either more or fewer modules are apparently utilized.

Figure 5:
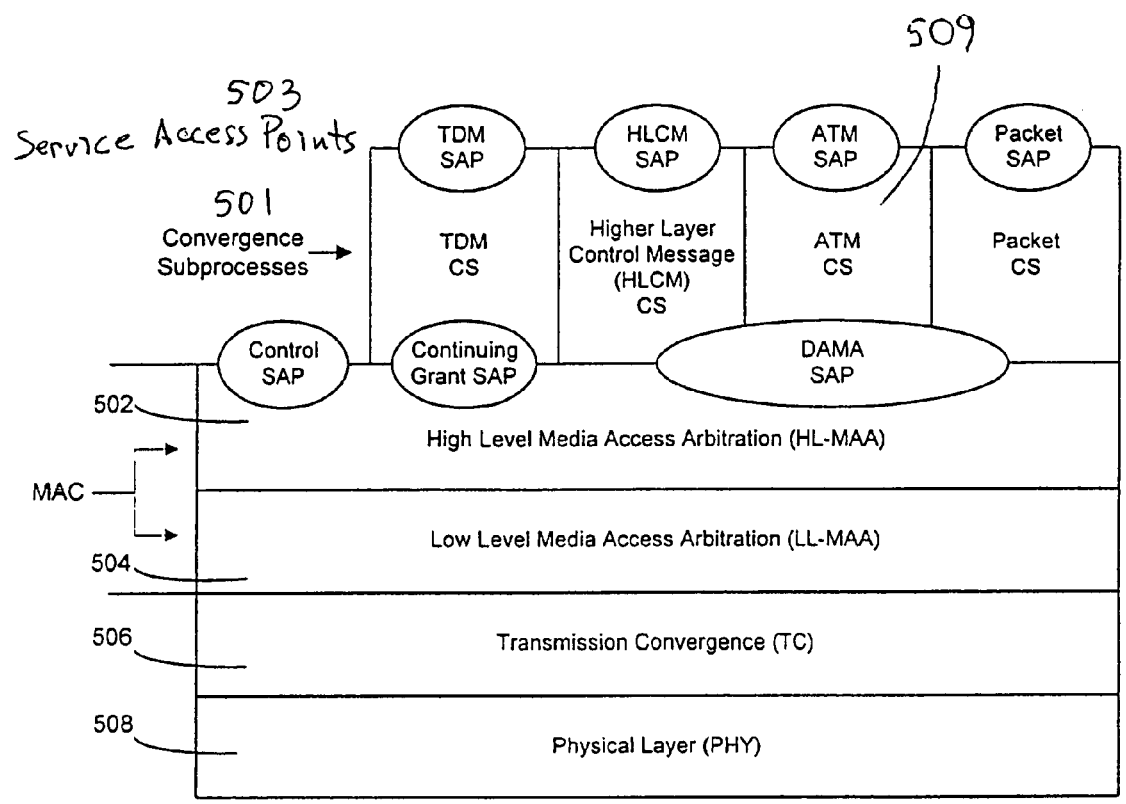
FIG. 5 shows a communication system layer architecture.

We refer additionally now to FIG. 5, which shows a preferred embodiment of layered data transport architecture roughly corresponding to the functionality of the Base Stations 110. The actual connection to the network occurs at one of the Service Access Points (SAPs) 503, which correspond generally to the Back-Haul Interface 124 (FIG. 3). The Base Station may be configured to provide access for any or all of TDM, HLCM, general Packet formats and ATM from the network. ATM cells, in particular, are then manipulated by a CS (Convergence Subprocess or Sublayer) or convergence system, ATM CS 509. This system is generally implemented in the apparatus and control programs of ATM switch 126, though the skilled person will recognize that some functions could be shifted to the Central Computer 128 or the Back-Haul Interface 124. After that layer of processing is completed, the data will enter the High Level Media Access Arbitration (HL-MAA) layer 502 through the Demand Assign Multiple Access Service Access Point (DAMA SAP). HL-MAA layer 502 is typically performed by the central computer 128, and constitutes the preparation of data for the plurality of CPEs (e.g. 116) which are within a particular sector (e.g. 112), such as merging the data flow for all of the CPEs and resolving sector-wide media sharing and signal quality issues. The individual channels 114, which are virtual channels on the downlink, are controlled by the Low Level Media Access Arbitration layer 504, the functionality of which is also generally implemented in the Central Computer 128. The Transmission Convergence 506 may be implemented by a modem which is part of the main unit. The physical transmission occurs within the PHY (Physical Layer) 508.

The foregoing describes a convergence system, and an apparatus and method for performing a convergence, which may be used in the Switch 5 of FIG. 1, is related to that taught in U.S. Ser. No. 09/430,379. In order to facilitate an understanding of this relationship, FIG. 5 herein is drawn from FIG. 5 of U.S. Ser. No. 09/430,379. One skilled in the art will understand that the convergence system and method detailed herein can be embodied in the ATM CS 509 of FIG. 5, or in the ATM CS of FIG. 5 of U.S. Ser. No. 09/430,379. As well, the convergence details herein may be embodied in apparatus for performing similar switch functions within a more generalized network, such as represented by the Switch 5 in FIG. 1, or in an ATM convergence system within any communication system. Further details of the convergence system and method are presented below.

5. Header Compression

We turn now to compression and translation of incoming data in a first format, which may have been formatted into such first format in a previous AAL process, into a second and variable-length packet format, e.g. MAC packets.

Figure 7:
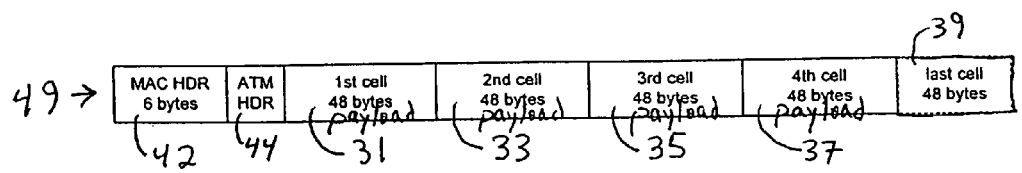
FIG. 7 represents a layout of data within a MAC packet.

After the last cell originating from a particular first-format packet, for example an ATM trailer cell, has arrived at a Switch 5, the essential data (both user data and overhead needed for transmission) from all cells belonging to that packet is reformatted into a second protocol, for example into one or more MAC format packets. Preferably, the header for each subsequent ATM cell is removed and the cell's payload data is concatenated to the first cell. The ATM cells represented in FIG. 6 may be reformatted into a MAC packet as shown in FIG. 7. A MAC packet 49 begins with a MAC header 42, typically 6 bytes, and is followed by a block 44 which contains the data from ATM headers 30, and also from the first ATM cell payload 31. The headers 30 of subsequent ATM cells are discarded, so that the next concatenated data is the second cell payload 33, third cell payload 35, fourth cell payload 37, and trailer cell payload 39. These concatenated ATM cell payloads with the associated intermediate headers removed may be treated by the MAC convergence layer as a single variable length packet. The ATM cell header overhead (cell tax) is reduced, in this instance, by omitting the intermediate headers.

FIG. 7 shows the variable-length packet formed by concatenating the first cell header 44 and payload 31 to the MAC packet header 42, and "encapsulating" the subsequent ATM payloads 33, 35, 37 and 39 in MAC packet 49 (i.e. disposing the ATM payloads as part of the MAC packet payload section).

Figure 8:
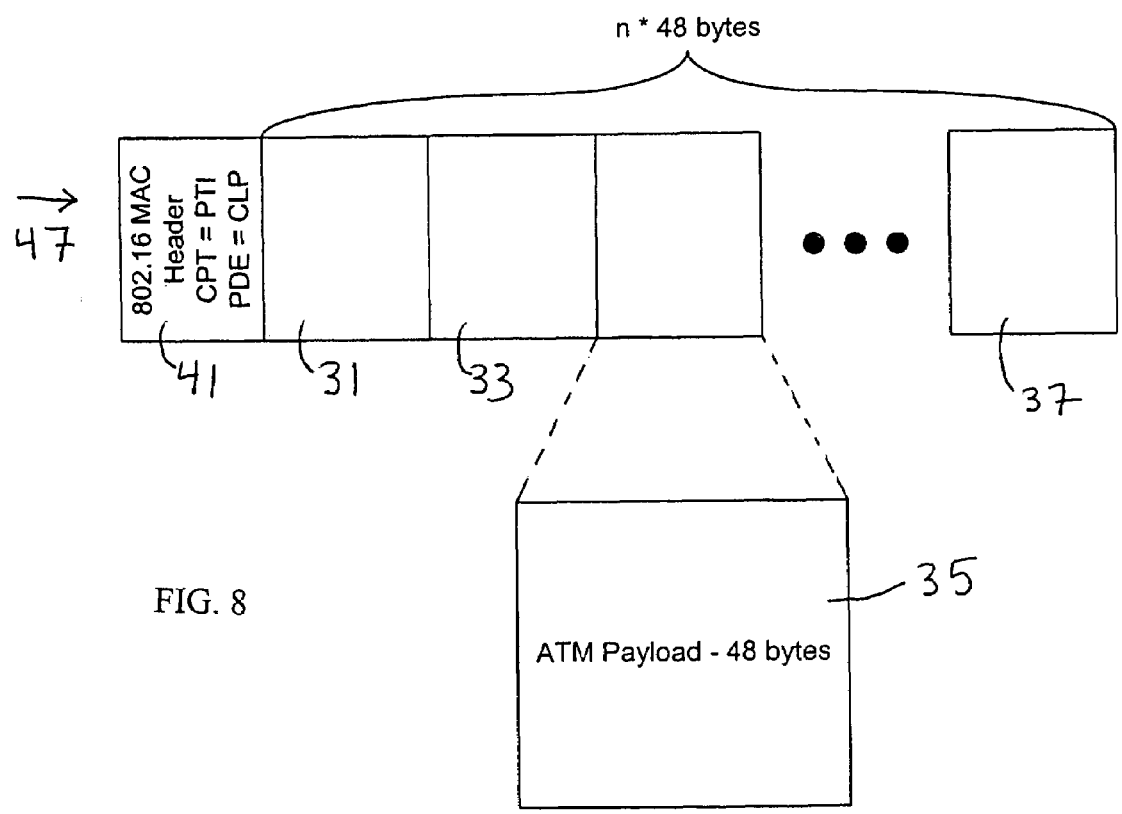
FIG. 8 shows mapping of ATM cell payloads into a MAC packet payload.

Preferably, however, fields in the ATM header will be "mapped" to corresponding fields in the MAC header to further save on bandwidth, as shown for example in FIG. 8. There, MAC packet 47 includes MAC header 41 into which the ATM header fields have been mapped. As a result, the ATM headers may then be discarded rather than encapsulated in the MAC payload. The MAC packet payload includes first ATM cell payload 31 (48 bytes), second ATM cell payload 33 (48 bytes), third ATM cell payload 35 (48 bytes), and so on to the Nth ATM cell payload 37. Accordingly, the total payload for MAC cell 47 will be 48 bytes times N-ATM cells.

5.a. Multiple Cell Header Mapping Details

In order to detail the mapping from ATM headers to MAC headers, we first describe examples of ATM headers and MAC headers. FIG. 9 shows the fields of an exemplary ATM header. The generic flow control 51 is four bits; but these four bits will often be allocated as VPI (Virtual Path Identifier) bits. Nibbles 52 and 53 are also allocated to the VPI, so that the VPI will typically be either eight or twelve bits. First VCI (Virtual Connection Identifier) nibble 54, along with VCI byte 55 and further VCI nibble 56 provide sixteen bits for the VCI. Additionally, there are 3 bits allocated for the Payload Type Indicator (PTI) 52 and one bit for Cell Loss Priority (CLP) 58.

Figure 11:
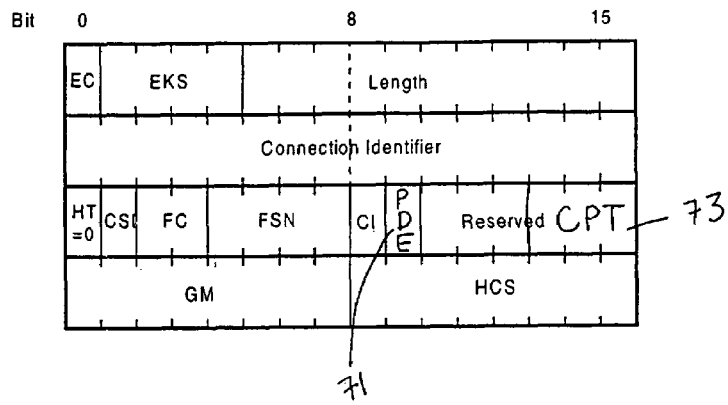
FIG. 11 shows an MAC header alternative to that of FIG. 10.

MAC headers may be defined a variety of ways. For example, FIG. 10 shows a MAC header as suggested in the unapproved Task Group document IEEE 802.16.1-00/01r4, September 2000. Various fields are defined, including encryption control bit 61, encryption key sequence 62, eleven bits of length 63, connection identifier (CID) 60, header type 64, convergence sublayer indication 65, fragmentation control 66, fragmentation sequence number 67, CRC indicator 68, grant (of resources) management 69, and header check sequence 70. There are also 7 bits of reserved space 72. FIG. 11 shows the MAC header of FIG. 10 in which four of the reserved bits have been designated as Packet Discard Eligibility (PDE) 71 and Convergence Pass Through (CPT) 73.

The actual mapping from the ATM cell header of FIG. 9 to the MAC packet header of FIG. 11 preferably includes mapping the ATM cell header PTI and CLP fields (57 & 58, respectively, in FIG. 9) to the CPT and PDE fields, respectively of the MAC packet header (71 and 73 of FIG. 11). Then, each unique combination of VPI and VCI in the ATM cell headers is mapped to the CID field of the target MAC header.

5.a.1. Mapping Alone:

In the situation described, up to 28 bits of combined VPI and VCI must be mapped to only 16 bits of CID. With mapping alone it will not be possible to distinguish all possible VPI/VCI combinations. Therefore, it is preferred to map VPI/VCI combinations to the CID as they arrive, conveying the mapping translation to the other end of the link as part of the connection provisioning process. For example, the first VPI/VCI combination encountered may be arbitrarily assigned 0001H, with the actual VPI/VCI values transmitted during provisioning; the next VPI/VCI encountered may be assigned 0002H, and the actual VPI/VCI conveyed to the receiving end of the link. The actual mapping is arbitrary, however, as long as it is known at both ends of the link.

Since MAC links are typically employed when a limited communication media must be shared, the address space limitation may well not be the limiting factor for accepting connections; the link may not have sufficient bandwidth in any event. To minimize the likelihood that addressing space will be a limiting factor, it is preferable that at least 16 bits of CID be available in the MAC header to which VPI/VCI may be mapped.

Once the VPI/VCI, PTI and CLP of the ATM cell headers have been mapped into the MAC packet headers, the ATM cell headers may be discarded, resulting in the MAC packet payload of 48 bytes times N-ATM cells, as described above.

It is not always desirable to map a representation of all of VPI/VCI into the MAC header CID. Therefore, it is preferred that a plurality of mapping procedures be employed, a particular mapping procedure being chosen for a particular connection at the time the connection is provisioned on the basis of one or more of several factors. One such factor is whether the connection address space is exhausted, while the link could otherwise carry more data. Another is whether the connection will be virtual path (VP) switched or virtual connection (VC) switched. The connection type for a particular connection is a parameter which forms part of the connection request, and thus is known during connection provisioning, as those skilled in the art will appreciate.

5.a.2. Mapping with Extension:

In the event that the connection address space is exhausted it may be necessary to effectively extend the MAC header by including connection information in the beginning of the "payload." VC switched ATM packets in a MAC packet have identical headers. In this case, two bytes of the MAC packet "payload" may be designated as auxiliary connection identifier bits. To implement this, allowance will preferably be made for distinguishing, in the MAC header, packets having differing QoS settings. This may be accomplished by reserving sufficient distinct CIDs so that different CIDs may be used depending upon the quality of service (QoS) which is required for each connection. Thus, if five distinct QoS levels must be provided for, then five distinct CIDs are required. The individual connections within each QoS bracket may be distinguished by a single 16 bit field at the beginning of the MAC packet payload, again with mapping between the encapsulated data and the actual VPI/VCI combination assigned during provisioning of the connection. In effect, an additional two bytes are thus added to the MAC header.

Figure 12:
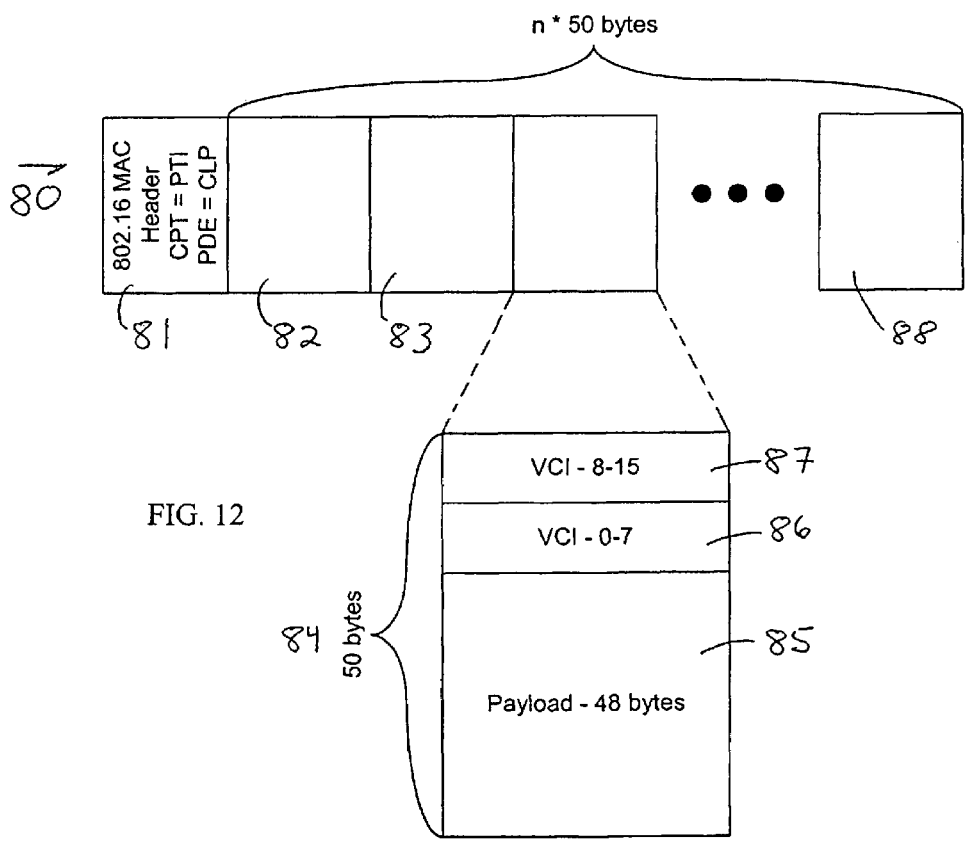
FIG. 12 shows ATM payload and partial header information in a MAC payload.

5.a.3. Mapping with Partial Encapsulation:

For the VP switched case the VCI should not form part of the routing, but should be carried along independently, so that many virtual connections are effectively carried on the same virtual path. Within each VP switched packet, each ATM cell may have a different VCI. The headers may not be identical between ATM packets being carried by a particular MAC packet. In this case the 16 bit VCI is preferably "encapsulated" to form 16 bits of the ATM cell payload, while the ATM header VPI is mapped to the MAC header CID. Referring to FIG. 12, MAC packet 80 includes header 81 in which the ATM cell VPI is mapped to a corresponding CID value, and preferably also in which the ATM header fields PTI and CLP are mapped to the MAC header CPT and PDE fields. The MAC packet payload is composed of two bytes 86, 87 of the ATM cell header's VCI, prepended to (or otherwise included with) forty-eight byte ATM payload 85.

Each such ATM payload/VCI combination 82, 83, 84 and 88 forms a fifty-byte load. Thus, the total MAC payload is fifty bytes times the number of ATM cells effectively conveyed in the packet. Since a maximum of 12 bits of VPI are available, all possible VPIs can be accommodated. This partly mapped, partly encapsulated treatment of the ATM header will be referred to as "semi-encapsulated."

Figures 13, 14:
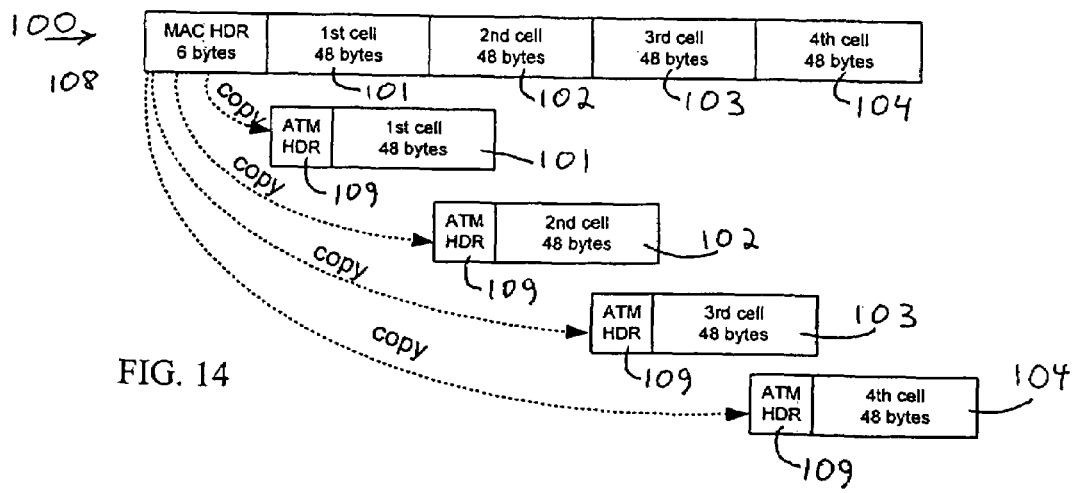
FIG. 13 shows mapping details between ATM and MAC headers.
FIG. 14 shows reconstruction of ATM cells from a MAC packet.

Mapping between ATM headers and MAC headers may be accomplished many other ways. For example, FIG. 13 shows mapping between an ATM header and an alternative MAC header having only five bytes. Aside from CPT and PDE, discussed previously as part of a MAC header, plus the Length byte and the first nibble (EH and PC/PM), all of the MAC header fields are designated as CID space. The CID fields are broken into CIDa and CIDb, which map to VPI and VCI directly, thereby overcoming the connection address limitation discussed previously.

FIG. 14 shows a method of reformatting data (e.g. MAC packet 100) which has traversed the link into e.g. ATM cell format. The ATM header information 109 is derived from MAC header 108 according to the mapping assignment established during the connection provisioning. ATM cell payloads 101, 102, 103 and 104 are pulled from the MAC packet payload.

5.b. Single Cell Header Mapping

The techniques described above, which map all or part of the common header from a sequence of ATM cells into a MAC packet header, may also be used when a single ATM cell is converted to a single MAC packet. If VP switching is required and no presumption can be established during connection setup to limit the number of bytes needed for the VCI, then part of the VCI must be encapsulated in the MAC packet payload. However, for VC switched ATM packets, and for VP connections requiring only a limited VC range, the entire ATM header can be mapped to the MAC header. Indeed, for ATM cells not sharing a header with other ATM cells, the bandwidth-saving effect of mapping is proportionally larger than with multiple cells.

6. Trailer Compression

As indicated previously, data which has been translated into ATM cells in accordance with the AAL5 convergence protocols will often have padding bytes added to a trailer cell. An ATM trailer cell is the last cell of a block of ATM cells which were converted from a particular message, such as defined by an IP packet. This padding is overhead which is preferably removed by the ATM to MAC convergence system. Other data which can be determined at both ends of a link, such as during provisioning of the connection, will preferably also be removed prior to transmission across a link.

Returning to trailer cell 40 of FIG. 6, we note first the eight-byte trailer field 38. This field includes a byte each for a Common Part Conversion Sublayer (CPCS) and a Service Specific Conversion Sublayer (SSCS). These may often be identified during connection provisioning, and therefore may be omitted from the MAC packet carrying the rest of the trailer data.

Padding 36 will generally be included in order to fill trailer cell 40 to the correct forty eight bytes plus header. This padding may be removed prior to concatenating data 34 and trailer data 38 onto ATM payloads 31, 33, 35 and 37 within MAC packet 20, creating a cell fragment. Note that the trailer cell fragment may be carried in a separate MAC packet, rather than being concatenated with the preceding data. Also note that if the padding byte pattern cannot be ascertained during connection provisioning, then a byte indicating the pattern it will have to be carried in the cell fragment. In that event the pattern byte should be disposed immediately preceding the trailer field (eight, or six bytes if CPCS and SSCS are omitted).

After the MAC packet traverses the link, the ATM trailer cell is reconstructed by first disposing CPCS and SSCS appropriately with respect to the trailer field (the last six bytes of the packet), if they were previously removed. Then, the resulting MAC payload (including these bytes) is divided by the length of the expected ATM cell payloads (plus VCI byte, if encapsulated); this will typically be 48, but is 50 if the VCI is encapsulated. After the division, if there is a remainder R then R bytes are removed from the end of the MAC payload. The last eight bytes of those R bytes are the trailer field; padding pattern bytes are then inserted before the trailer field until R matches the expected ATM payload. Then, any prepended VCI encapsulation is removed, and entered into the appropriate field of the ATM cell which is reconstructed from the information mapped into the MAC header.

The trailer field of the trailer cell includes the Cyclic Redundancy Check field, which should be applied to the entirely reconstructed ATM cells to check for errors. Trailer compression may be utilized alone, or in combination with header compression.

7. Convergence System Flowchart

Figure 15:
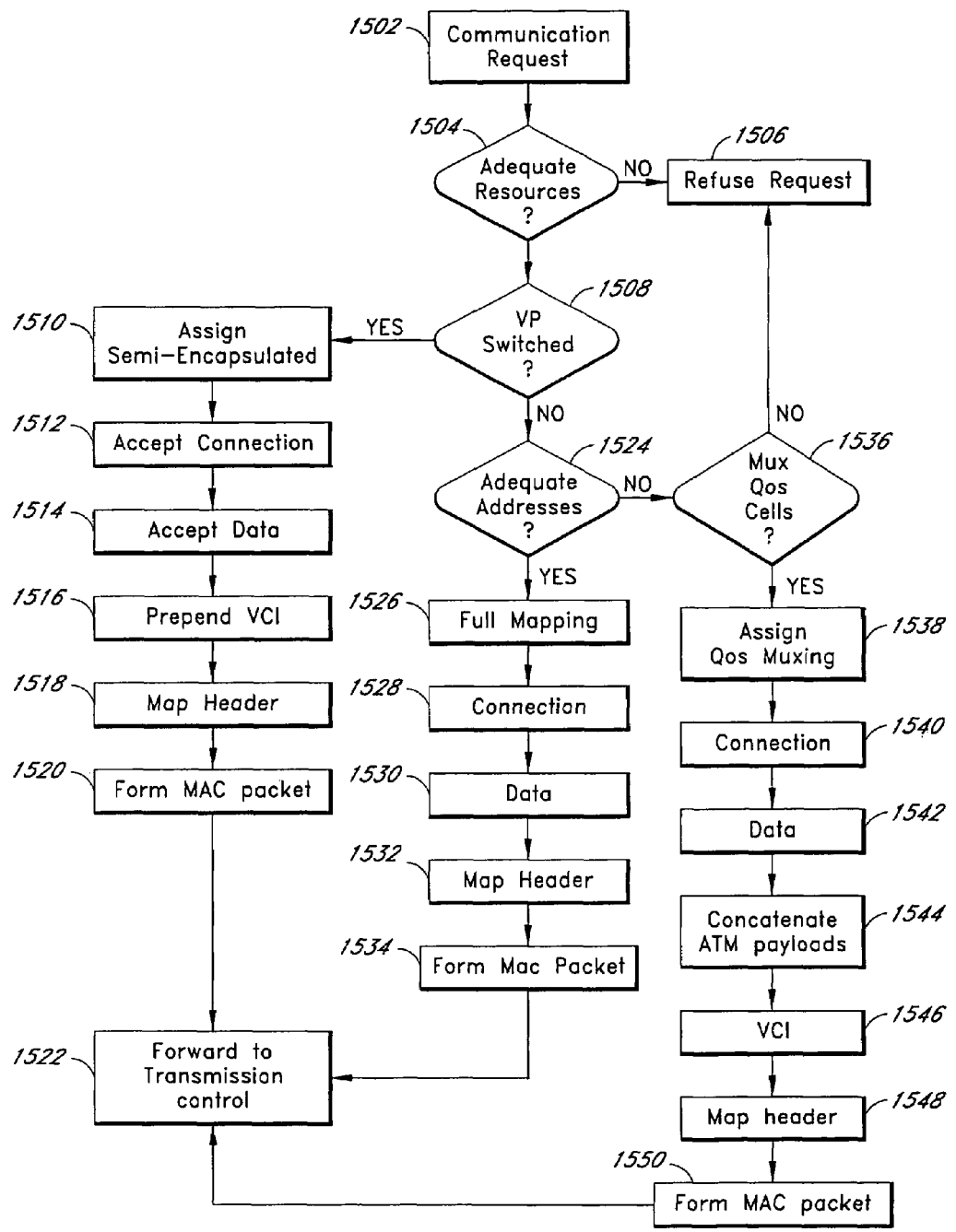
FIG. 15 is a programmatic flow chart of data translation and compression.

FIG. 15 shows a flow chart detailing steps performed by functional modules of a convergence system embodying aspects of the present invention. The ATM switch 126 of FIG. 3 preferably includes such a convergence system, as does the Switch 5 of FIG. 1. The steps may be performed by hardware under computer control, with decisional functionality divided between the hardware and software for engineering convenience. All functions can be performed in hardware, for example one or more ASICs, or all decisions can be made by a programmable computing system, with only low-level data input and output performed by hardware.

FIG. 4 shows modules of a convergence system which may follow the present flowchart, so reference will be made to FIG. 4 as well as to FIG. 15. At 1502 the system receives a request to establish a virtual connection at its connection provisioning module (CPModule). At 1504 the CPModule 404 performs a check to determine if sufficient resources, including bandwidth, are available to service the request. If not, the CPModule 404 refuses the connection at 1506, and otherwise determines whether the connection is to be VP (virtual path) switched, or not, at 1508. If VP switched, then at 1510 the CPModule 404 assigns semiencapsulation compression for the connection, conveys the parameters to both ends of the link and accepts the connection at 1512.

At 1514 incoming data for the now-established connection is accepted by the ATM segmentation module (ASModule) 408, which segregates the data either logically or physically into blocks comprising one or more ATM cells having a common VPI (virtual path identifier), though presumably different VCIs (virtual connection identifiers). At 1516 the ASModule 408 also appends the VCI of each ATM cell to the cell payload, preferably prepending it thereto to form the first two bytes of a fifty-byte "extended payload" for later entry into a MAC packet. At 1518, the MAC header module (MHModule) 410 maps common remainders of the segregated ATM headers into a header for a MAC packet to carry the data. At 1520 the MAC reassembly module (MRModule) 412 strips away the ATM cell headers (except for the VCI). In 1520 the MRModule 412 concatenates the "extended payloads" for inclusion in the MAC packet payload, and prepends the MAC header to form the MAC packet. The processing then continues at 1522, where the MAC transmission module (MTModule) 414 further prepares the MAC packet for transmission across the physical link, represented by the Further Transmission block 416.

If at 1508 it is determined that the connection is not to be VP switched, then processing continues at 1522, where the CPModule checks whether adequate addressing space exists in the MAC header to accommodate the new connection. If ample space exists, then at 1524 the CPModule assigns full mapping for the connection. The CPModule defines the mapping at both ends of the link when the connection is accepted at 1528. At 1530, one or more ATM cells having the common VPI/VCI are received by the ASModule (ASM), which makes pertinent sections of the ATM cells available to the MRModule. At 1532 the MRModule maps the common header of the ATM cells into a MAC packet header. At 1534 the MRModule concatenates the ATM cell payloads from the ASModule for inclusion in the MAC packet payload, and forms the MAC packet with the MAC header prepended to the payload. Processing then continues at 1522, as above.

If at 1524 the CPModule determines that address space is low, then at 1536 the CPModule also decides whether to accommodate further connections by multiplexing cells having a common QoS (Quality of Service) requirement. If such multiplexing is not supported, or for other reasons further connections are not desired, then the CPModule refuses the connection at 1506. If further connections are to be accommodated, then at 1538 the CPModule assigns QoS multiplexing for the connection, and communicates the parameters of the connection to both ends while accepting and provisioning the connection at 1540. In particular, the CPModule assigns a CID connection identifier which has a QoS matching that of the desired connection. When the CPModule later accepts further connections in this path of the flowchart, it will give them the same connection identifier as previous data blocks received having the same QoS, or a new CID if they have a new QoS parameter for which a multiplexed connection has not yet been established. Thus, there only need be as many multiplexed CIDs assigned as there are QoS levels.

At 1542 the ASModule accepts and segregates one or more ATM cells having identical VPI/VCI values. At 1544, the MRModule concatenates the segregated ATM cell payloads to form part of a MAC packet payload. At 1546, the MRModule prepends two bytes of the VCI are prepended to the concatenated ATM payloads for inclusion in the MAC packet payload. At 1548 the MHModule maps ATM headers, exclusive of the previously prepended VCI bytes, into the MAC header as defined during the connection provisioning at 1540. At 1550 the MRModule prepends the MAC packet header thus formed to the MAC packet payload. Note that the order of steps 1540-1550 is not generally important. After step 1550, the formed MAC packet is forwarded at step 1522 to the MTModule.

The steps shown in FIG. 15 may be performed in a single computer program, or may be performed by parts of otherwise independent programs, and may also be performed entirely by hardware under some software control. Not all of the steps shown are employed by every aspect of the present invention, nor are all steps of all aspects of the invention shown.

Other aspects of the system control are either known to those skilled in the art, or are described in detail in the documents which are incorporated by reference herein.

The invention has been described in several exemplary embodiments and aspects. The scope of the invention is not to be limited by the examples provided, but only by the claims which follow.

What is claimed is:

1. A convergence system for translating data received in an ATM format into a MAC format, the convergence system comprising:
   a network connection provisioning module to grant or reject requests for a communication channel connection which is adapted to select a compression method from a plurality of selectable compression methods upon a grant of a connection, at least one of which includes mapping ATM cell addressing bits into MAC packet addressing fields;
   an ATM segmentation module to buffer data which is incoming on the granted connection and to provide portions of the data to other modules depending, at least in part, upon the selected compression method;
   a MAC header module to derive a header for a MAC packet from data in one or more incoming ATM cells having a common destination in combination with connection parameters including any selected header compression methods;
   a MAC reassembly module to format data from the ATM segmentation module and the MAC header module into an outgoing MAC data packet having a header and a payload which represents incoming data from one or more ATM cells sharing a common destination; and
   wherein for at least one of the selectable compression methods the MAC reassembly module is further adapted to include payload data of a plurality of ATM cells sharing a common destination, and to encapsulate at least a portion of ATM header addressing data from at least one to the plurality of ATM cells in the payload of the outgoing MAC data packet.

2. The convergence system of claim 1 wherein for at least one of the selectable compression methods the MAC reassembly module is further adapted to include payload data of a plurality of ATM cells sharing a common destination and to encapsulate a virtual connection identifier from header of the plurality of ATM cells with the ATM payload data.

3. The convergence system of claim 1 wherein for at least one of the selectable compression methods the ATM segmentation module is further adapted to remove padding from an ATM trailer cell payload, and to provide payload data from the trailer cell to the MAC reassembly module.

4. The convergence system of claim 1 wherein for at least one of the selectable compression methods the ATM segmentation module is adapted to remove padding and CPCS and SSCS bytes from an ATM trailer cell payload prior to providing payload data from the trailer cell to the MAC reassembly module.

5. The convergence system of claim 1 wherein for at least one of the selectable compression methods the ATM segmentation module is adapted to remove padding from an ATM trailer cell payload and append a padding pattern byte representative of a patter of the padding removed prior to providing payload data from the trailer cell to the MAC reassembly module.

6. A method for compressing and converting data packets initially in a first fixed-length packet format to a second packet format for transmission through a link, at least one of the initial data packets including a header containing overhead data appended by a communication system, the method comprising:
   obtaining a plurality of incoming packets formatted in the first fixed-length format, said incoming packets having header addressing data, a first portion of said header addressing data comprising common header addressing data and a second portion of said header addressing data comprising header addressing data which is not common; and
   preparing a second-format packet to convey payload data from the plurality of incoming packets by:
      mapping the common addressing data into a header of the second format packet,
      entering payload data from the plurality of incoming packets into a payload section of the second-format packet,
      omitting the common addressing data from the payload of the second-format packet, and
      encapsulating said second portion of said header addressing data of said incoming packets with said payload section of said second-format packet.

7. The method for compressing and converting data packets of claim 6 wherein the first-format header is substantially mapped into the second-format header, and the entire first-format header is substantially omitted form the second-format payload.

8. The method for compressing and converting data packets of claim 6 wherein the first format packets substantially comprise ATM cells, the second format packets substantially comprise MAC packets, and said second portion substantially comprises a virtual connection identifier.

9. The method for compressing and converting data packets of claim 6 wherein the first-format packets comprise ATM cells and the second-format packets comprise MAC packets.

10. The method for compressing and converting data packets of claim 6, and further comprising removing padding data from a trailer packet of the plurality of first-format packets.

11. The method for compressing and converting data packets of claim 10 wherein the first-format packets comprise ATM cells, the second-format packets comprise MAC packets, the trailer packet comprises an ATM trailer cell containing an end-of-message indication, and further comprising removing CPCS and SSCS bytes from the ATM trailer cell.

12. A method compressing data packets in a first fixed-length packet format to provide data packets in a second packet format for transmission through a link, the initial data packets including user data intended for an end user and a header containing overhead data appended by a communication system, the method comprising:
   obtaining a plurality of incoming packets formatted in the first fixed-length format, the incoming packets having overhead data comprising an identical first portion and an unidentical second portion;
   preparing a second-format packet to convey data from the one or more incoming packets by:
      mapping the first-format header overhead data into a header of the second-format packet;
      representing user data from the one or more first-format packets in a payload of the second-format packet;
      omitting said identical first portion from the second-format payload first-format header overhead data mapped into the second-format packet header of the second-format packet; and encapsulating said unidentical second portion in said payload into the second-format payload.

13. The method for compressing data packets of claim 12, and further comprising:
obtaining a first-format trailer data packet indicating that the trailer packet is a last packet of a block of packets having a common destination, the trailer packet including a payload having user data and overhead padding bytes;
including the user data from the trailer packet payload with payload data from the one or more first-format packets in the second-format payload, and
omitting at least some of the padding bytes from the second-format payload.

14. The method for compressing data packets of claim 13 wherein the second-format data packets are MAC packets, the first-format data packets are ATM cells, and the trailer packet is an ATM trailer cell which includes CPCS and SSCS bytes; and wherein all padding bytes are omitted from the MAC packet, and the CPCS and SSCS bytes from the ATM trailer cell are omitted from the MAC packet.

15. A method for compressing data packets from a first fixed-length packet format to a second packet format prior to transmission through a link, the data packets in said first fixed-length packet format including a header containing overhead data appended by a communication system, the method comprising:
determining, during setup of a particular packet block transfer, whether virtual path type switching or virtual connection type switching is to be used for the particular packet block transfer;
obtaining a plurality of incoming packets formatted in the first fixed-length format, the incoming packets having at least a portion of information in respective headers which is identical and constituting at least part of the particular packet block transfer;
preparing a second-format packet to convey data from the plurality of incoming packets by selecting, dependent at least in part upon a type of switching to be used as established during block transfer setup; either
mapping header data from one of the first-format packet headers into the second-format header, appending data indicative of user data in the first-format header data from the payload of the second-format packet, or
mapping a porting of header data from one of the first-format packet headers into the second-format header, omitting the mapped portion of header data from other parts of the second-format packet, and placing data indicative of remaining first-format header data along with payload data from at least some of the incoming packets into a payload section of the second-format header.

16. A method comprising:
receiving data in a plurality of first-format packets comprising common header addressing data and formatted according to a first format, the first format being a fixed length format; wherein said plurality of first-format packets comprise ATM cells and said ATM cells comprise an ATM trailer, said ATM trailer comprises a payload comprising user data and overhead padding bytes;
selecting a compression process from among a plurality of compression processes;
mapping at least some of said common addressing data to one or more fields of a second-format packet based, at least in part, on said selected compression process;
combining payload data of said first-format packets in a payload of said second-format packet based, at least in part, on said selected compression process;
omitting redundant common addressing data from said payload of said second-format packet;
including said user data in said payload of said second-format packet; and
omitting at least a portion of said padding from said payload of said second-format packet.

17. The method of claim 16, and further comprising omitting from said payload of said second-format packet one or more of CPCS bytes and/or SSCS bytes of an ATM trailer cell among said received packets.

18. The method of claim 16, and further comprising:
including in said payload of said second-format packet a padding pattern byte representative of said omitted packet padding.

19. The method of claim 16, wherein said second-format packet comprises a MAC packet, and further comprising deriving a MAC header for said MAC packet based, at least in part, on said common header addressing data.

20. The method of claim 16, and further comprising receiving a request for a communication channel connection, and wherein said
selecting a compression process from among a plurality of compression processes further comprises selecting said compression process upon grant of said received request.

21. The method of claim 16, and further comprising including at least a portion of said common addressing data in said payload of said second-format packet.

22. The method of claim 16, wherein said first-format packets comprise a first-format packet header, and further comprising:
mapping said first-format packet heater to a header of said second-format packet; and
omitting said first-format packet header from said payload of said second-format packet.

23. The method of claim 16, and further comprising receiving at least some non-common addressing data in said received first-format packets; and
encapsulating at least a portion of said non-common addressing data in said payload of said second-format packet.

24. The method of claim 16, and further comprising disposing a portion of first-format header addressing data common to said incoming packets in a single field of said second-format packet.

25. The method of claim 16, and further comprising:
receiving at one of more directional antennas signals transmitted from one or more subscribers;
decoding said received signals into received data having said second-packet format; and
reformatting said received data having said second-packet format into data having said first-packet format.

26. A method comprising:
receiving data in a plurality of first-format packets of at least a portion of a packet block transfer over a communication channel comprising common header addressing data and formatted according to a first format, the first format being a fixed length format;
combining payload data of said first-format packets in a payload of a second-format packet;
mapping header data from one of said first-format packet headers into header portion of said second-format packet, appending data reflective of user data in said first-format packets to said payload of said second-format packet, and omitting first-format header data from the payload of the second-format packet in response to said communication channel being provisioned for virtual connection switching; and mapping a portion of header data from one of said first-format packet headers into a header of said second-format packet, omitting said mapped portion of header data from other portions of said second-format packet, and placing data reflecting remaining first-format header data with payload data from at least some of said incoming packets into said payload second of said second-format packet in response to said communication channel being provisioned for virtual path switching.

27. An apparatus comprising:

means for receiving data in a plurality of first-format packets comprising common header addressing data and formatted according to a first format, the first format being a fixed length format, wherein said plurality of first-format packets comprise ATM cells;

means for selecting a compression process from among a plurality of compression processes;

means for mapping at least some of said common addressing data to one of more fields of a second-format packet based, at least in part, on said selected compression process;

means for combining payload data of said first-format packets in a payload of said second-format packet based, at least in part, on said selected compression process;

means for omitting redundant common addressing data from said payload of said second-format packet; and means for omitting from said payload of said second-format packet one or more of padding, CPCS bytes and/or SSCS bytes of an ATM trailer cell among said received packets.

28. The apparatus of claim 27, wherein said ATM cells comprise an ATM trailer, said ATM trailer comprises a payload comprising user data and overhead padding bytes, the apparatus further comprising:

means for including said user data in said payload of said second-format packet; and means for omitting at least a portion of said padding from said payload of said second-format packet.

29. The apparatus of claim 27, and further comprising:

means for omitting from said payload of said second-format packet padding of an ATM trailer cell among said received packets; and means for including in said payload of said second-format packet a padding pattern byte representative of said omitted packet padding.

30. The apparatus of claim 27, wherein said second-format packet comprises a MAC packet, and further comprising means for deriving a MAC header for said MAC packet based, at least in part, on said common header addressing data.

31. The apparatus of claim 27, and further comprising means for receiving a request for a communication channel connection, and wherein said means for selecting a compression process from among a plurality of compression processes further comprises means for selecting said compression process upon grant of said received request.

32. The apparatus of claim 27, and further comprising means for including at least a portion of said common addressing data in said payload of said second-format packet.

33. The apparatus of claim 27, wherein said first-format packets comprise a first-format packet header, and further comprising:

means for mapping said first-format packet header to a header of said second-format packet; and means for omitting said first-format packet header from said payload of said second-format packet.

34. The apparatus of claim 27, and further comprising:

means for receiving at least some non-common addressing data in said received first-format packets; and means for encapsulating at least a portion of said non-common addressing data in said payload of said second-format packet.

35. The apparatus of claim 27, and further comprising means for disposing a portion of first-format header addressing data common to said incoming packets in a single field of said second-format packet.

36. The apparatus of claim 27, and further comprising:

means for receiving at one of more directional antennas signals transmitted from one or more subscribers;

means for decoding said received signals into received data having said second-packet format; and means for reformatting said received data having said second-packet format into data having said first-packet format.

37. An apparatus comprising:

means for receiving data in a plurality of first-format packets of at least a portion of a packet block transfer over a communication channel comprising common header addressing data and formatted according to a first format, the first format being a fixed length format;

means for combining payload data of said first-format packets in a payload of a second-format packet;

means for mapping header data from one of said first-format packet headers into a header portion of said second-format packet, appending data reflective of user data in said first-format packets to said payload of said second-format packet, and omitting all first-format header data from the payload of the second-format packet in response to said communication channel being provisioned for virtual connection switching; and means for mapping a portion of header data from one of said first-format packet headers into a header of said second-format packet, omitting said mapped portion of header data from other portions of said second-format packet, and placing data reflecting remaining first-format header data with payload data from at least some of said incoming packets into said payload second of said second-format packet in response to said communication channel being provisioned for virtual path switching.

38. A system comprising:

one or more base stations comprising:

a segmentation module adapted to buffer data received in a plurality of first-format packets comprising common header addressing data and formatted according to a first format, said first format being a fixed length format, wherein said plurality of first-format packets comprise ATM cells;

a MAC module adapted to:

determine a compression process from among a plurality of compression processes;

may at least some of said common addressing data to one of more fields of a second-format packet based, at least in part, on said determined compression process;

combine payload data of said first-format packets in a payload of said second-format packet based, at least in part, on said determined compression process;

omit redundant common addressing data from said payload of said second-format packet; and omit from said payload of said second-format packet padding of an ATM trailer cell among said received packets; and include in said payload of said second-format packet a padding pattern byte representative of said omitted packet padding;

a radio frequency transmitter to transmit said second-format packet encoded in a radio frequency signal; and one or more customer premises equipment (CPE) station comprising:

a radio frequency receiver to receive the radio frequency signal; and a decoder to decode at least a portion of said second-format packet based, at least in part, on said received radio frequency.

39. The system of claim 38, the system further comprising a back-haul connection coupled to the one or more base stations to provide one or more of the CPE stations with access to an Internet service.

40. The system of claim 38, wherein the system further comprises a video server capable of providing a video service to at least one of said CPE stations.

41. The system of claim 38, wherein the system further comprises at least one residential gateway coupled to one of said CPE stations.

42. The system of claim 41, wherein the system further comprises at least one ATM switch coupled to segmentation module to provide at least one ATM service to one or more of the CPE stations.

43. The system of claim 42, wherein the ATM switch is adapted to provide at least one of a video service, a voice service and/or a data service or combinations thereof to said one or more of the CPE stations over said ATM switch.

44. The system of claim 38, wherein said system further comprises a sectored active antenna array coupled to said radio frequency transmitter.

45. The system of claim 38, wherein said ATM cells comprise an ATM trailer, said ATM trailer comprises a payload comprising user data and overhead padding bytes, and wherein said MAC module is further adapted to:

include said user in said payload of said second-format packet; and omit at least a portion of said padding from said payload of said second-format packet.

46. The system of claim 38, wherein said MAC module is further adapted to omit from said payload of said second-format packet one or more of padding, CPCS bytes and/or SSCS bytes of an ATM trailer cell among said received packets.

47. The system of claim 38, wherein said second-format packet comprises a MAC packet, and wherein said MAC module is further adapted to derive a MAC header for said MAC packet based, at least in part, on said common header addressing data.

48. The system of claim 38, wherein said MAC module is further adapted to include at least a portion of said common addressing data in said payload of said second-format packet.

49. The system of claim 38, wherein said first-format packets comprise a first-format packet header, and wherein said MAC module is further adapted to:

map said first-format packet header to a header of said second-format packet; and omit said first-format packet header from said payload of said second-format packet.

50. The system of claim 38, wherein said first-format packets comprise at least some non-common addressing data, and wherein said MAC module is further adapted to encapsulate at least a portion of said non-common addressing data in said payload of said second-format packet.

51. The system of claim 38, wherein said MAC module is further adapted to dispose a portion of first-format header addressing data common to said incoming packets in a single field of said second-format packet.

52. A system comprising:

one or more base stations comprising:

a segmentation module adapted to buffer data received in a packet block transfer over a communication channel, said packet block transfer comprising a plurality of first-format packets comprising common header addressing data and formatted according to a first format, said first format being a fixed length format;

a MAC module adapted to:

map a portion of header data from one of said first-format packet headers into a header portion of said second-format packet, include data reflective of user data in said first-format packets to said payload of said second-format packet, and omit first-format header data from the payload of the second-format packet if said communication channel is provisioned for virtual connection switching; and map a portion of header data from one of said first-format packet headers into a header of said second-format packet, omit said mapped portion of header data from other portions of said second-format packet, and place data reflecting remaining first-format header data with payload data from at least some of said incoming packets into said payload second of said second format packet if said communication channel is provisioned for virtual path switching; and a radio frequency transmitter to transmit said second-format packet encoded in a radio frequency signal; and one or more customer premises equipment (CPE) stations comprising:

a radio frequency receiver to receive the radio frequency signal; and a decoder to decode at least a portion of said second-format packet based, at least in part, on said received radio frequency signal.

* * * * *